United States Patent
Huang et al.

(10) Patent No.: US 9,227,355 B2
(45) Date of Patent: Jan. 5, 2016

(54) EXTRUSION BLOW MOLDING MACHINE AND BLOW MOLDING METHOD USING THE MACHINE

(71) Applicant: South China University Of Technology, Guangdong (CN)

(72) Inventors: Hanxiong Huang, Guangdong (CN); Weiping Li, Guangdong (CN); Quanjie Wang, Guangdong (CN)

(*) Notice: Subject to any disclaimer, the term of this patent is extended or adjusted under 35 U.S.C. 154(b) by 384 days.

(21) Appl. No.: 13/729,003

(22) Filed: Dec. 27, 2012

(65) Prior Publication Data

US 2014/0183796 A1 Jul. 3, 2014

(51) Int. Cl.

| B29C 49/04 | (2006.01) |
|---|---|
| B29C 49/28 | (2006.01) |
| B29C 49/42 | (2006.01) |
| B29C 49/56 | (2006.01) |
| B29C 47/00 | (2006.01) |
| B29C 47/08 | (2006.01) |
| B29C 49/24 | (2006.01) |

(52) U.S. Cl.
CPC ............. B29C 49/04 (2013.01); B29C 49/4236 (2013.01); B29C 49/56 (2013.01); *B29C 47/0023* (2013.01); *B29C 47/0054* (2013.01); *B29C 47/0864* (2013.01); *B29C 49/28* (2013.01); *B29C 2049/2458* (2013.01)

(58) Field of Classification Search
CPC .... B29C 49/04; B29C 49/28; B29C 49/4236; B29C 49/56; B29C 47/0054; B29C 47/0023; B29C 47/0864
See application file for complete search history.

(56) References Cited

U.S. PATENT DOCUMENTS

| 4,431,037 A * | 2/1984 | Schevey ................ B67C 7/0033 141/172 |
|---|---|---|
| 5,338,173 A * | 8/1994 | Kato .................... B29C 49/0073 425/150 |
| 5,478,229 A * | 12/1995 | Kato ........................ B29C 49/32 264/532 |
| 6,214,282 B1 * | 4/2001 | Katou ..................... B65B 3/022 264/163 |
| 6,499,988 B1 * | 12/2002 | Miura ..................... B29C 49/32 425/451 |
| 6,544,026 B1 * | 4/2003 | Stocksiefen ............ B29C 33/22 264/523 |
| 8,827,679 B2 * | 9/2014 | Giacobbe ............ B29C 49/4236 425/162 |

FOREIGN PATENT DOCUMENTS

| DE | 19528751 A1 * | 10/1996 | .............. B29C 49/32 |
|---|---|---|---|
| DE | 10253555 B3 * | 5/2004 | .............. B29C 49/56 |

* cited by examiner

*Primary Examiner* — Robert B Davis
(74) *Attorney, Agent, or Firm* — Prakash Nama; Global IP Services, PLLC

(57) ABSTRACT

An extrusion blow molding machine comprises an extrusion apparatus, an electrically-driven parison thickness programming apparatus, an electrically-driven mold-clamping apparatus with a dual-driving function, and a frame, wherein the extrusion apparatus, the parison thickness programming apparatus and the mold-clamping apparatus with a dual-driving function are installed on the frame. The mold-clamping apparatus with a dual-driving function comprises a driving assembly, a mold-opening/closing assembly, a mold-moving assembly, and a base. The driving assembly includes a servo motor, which actuates both mold-opening/closing and mold-moving assemblies, respectively. The parison thickness programming apparatus is driven by asynchronous motors, which run in a single direction continuously to result in a required axial parison thickness distribution. An extrusion blow molding method is realized using the machine. The present extrusion blow molding machine has an obviously simplified and compact structure, thereby reducing the manufacturing cost, lowering the energy consumption, and improving the transmission efficiency and position accuracy.

10 Claims, 5 Drawing Sheets

EXTRUSION BLOW MOLDING MACHINE AND BLOW MOLDING METHOD USING THE MACHINE

BACKGROUND OF THE INVENTION

The present invention relates to an extrusion blow molding machine used for manufacturing many different products in the polymer industry, and particularly to an electrically-driven extrusion blow molding machine and an extrusion blow molding method realized using the machine.

Blow molding is one of the three major molding technologies used for the polymeric materials. Extrusion blow molding accounts for a large proportion in the blow molding area. The parison thickness programming and mold-clamping apparatuses are both hydraulically-driven in most of the available extrusion blow molding machines. The hydraulically-driven apparatus has some disadvantages, such as poorer control accuracy and repeatability, higher energy consumption and noise, unsuitable for "clean room" manufacturing environments, and so on. Therefore, for some applications, the hydraulically-driven apparatus is facing competition from the electrically-driven one. However, the available electrically-driven blow molding machines still have some disadvantages, such as a complicated structure and a high manufacturing cost. The parison thickness programming apparatus in the available electrically-driven blow molding machine is generally driven by a servo motor. The frequent start and stop and frequent normal and opposite running of the servo motors result in their heating and so shorten their service life. Moreover, the mold-opening/closing and mold-moving assemblies of the mold-clamping apparatus in the available electrically-driven blow molding machines are generally driven by a set of separate electric transmission device including a servo motor, respectively.

BRIEF SUMMARY OF THE INVENTION

An object of the present invention is to overcome the aforementioned shortcomings of the available extrusion blow molding machines and to provide an extrusion blow molding machine, which comprises an electrically-driven mold-clamping apparatus with a dual-driving function and an electrically-driven parison thickness programming apparatus with two motors running in a single direction continuously to result in a required axial parison thickness distribution.

Another object of the invention is to provide an extrusion blow molding method realized using the aforementioned extrusion blow molding machine.

Said extrusion blow molding machine further comprises an extrusion apparatus and a frame, wherein the extrusion apparatus, the parison thickness programming apparatus and the mold-clamping apparatus with a dual-driving function are installed on the frame.

Said mold-clamping apparatus with a dual-driving function comprises a driving assembly, a mold-opening/closing assembly, a mold-moving assembly, and a base. The driving assembly, the mold-opening/closing assembly, and the mold-moving assembly are integrally connected and installed on the base.

Said driving assembly includes a servo motor, a coupling, and a gear transmission box. The gear transmission box, which is connected with the servo motor through a coupling, has two mutually perpendicular output shafts.

Said mold-opening/closing assembly comprises a mold-clamping clutch, a mold-clamping ball screw with a ball nut, a toggle mechanism, two mold-clamping linear guides, a back plate, a front plate, a middle plate, a required number of tie bars, a synchronizing means, and two mold halves. The output end of the mold-clamping clutch is jointed with the shaft end of the mold-clamping ball screw, which is rotatably mounted across the back plate through a ball bearing. The two ends of the toggle mechanism are mounted on the back plate and the middle plate, respectively, and the crosshead of the toggle mechanism is connected with the mold-clamping ball nut. The middle plate is movably mounted on the tie bars. The synchronizing means is installed on the base. Two ends of the synchronizing means are connected with the middle plate and the front plate, respectively. On the opposed surfaces between the front plate and the middle plate are mounted the mold halves. The back plate, the front plate, and the middle plate can reciprocate along the mold-clamping linear guides, which are installed on the base.

Said mold-moving assembly includes a mold-moving clutch, a coupling device, a mold-moving ball screw with a ball nut, two tapered roller bearings, two glands, two support plates, and two mold-moving linear guides. The driving end of the coupling device is jointed with the output end of the mold-moving clutch. The driven end of the coupling device and the mold-moving ball nut are connected together through screws and are supported within the tapered roller bearings, which are positioned within the two glands. The two glands are mounted on the two side surfaces of the side plate in the base through screws. Both shaft ends of the mold-moving ball screw are fixed in the support plates. The mold-moving linear guides, which are perpendicular to the mold-clamping linear guides, and the support plates are installed on the frame. The base can reciprocate on the mold-moving linear guides.

Said coupling device can be a synchronous belt driving device or a chain transmission device. The synchronous belt driving device comprises a synchronous belt, a driving pulley, and a driven pulley. The driving pulley is connected with the driven pulley via the synchronous belt.

Two output shafts of said gear transmission box are jointed with the input ends of both mold-clamping clutch and mold-moving clutch, respectively.

Said parison thickness programming apparatus includes a first motor, a second motor, two synchronous belts, a clutch member, a reduction box, a shaft coupling, a ball screw with a ball nut, a thrust bearing, an outer bush with a sliding chute, and an inner bush with a sliding block. The clutch member consists of a first clutch, a second clutch, a brake clutch, a first input turnplate, a second input turnplate, an output shaft, and a housing. The first and second motors are connected with the first and second input turnplates, respectively, through the synchronous belts. The aforementioned three clutches share the output shaft of the clutch member as the output. The first or second input turnplate is coupled with the output shaft of the clutch member when the first or second clutch is energized; whereas the output shaft is coupled with the housing when the brake clutch is energized. The output shaft of the clutch member is jointed with the input end of the reduction box, the output end of which is connected with the shaft end of the ball screw through the shaft coupling. The shaft end of the ball screw is rotatably mounted in the shoulder at the top of the outer bush through the thrust bearing. The ball nut is carried within the cross sliding block in the inner bush and so is restrained from rotation. The inner bush is coaxially positioned within the outer bush. Both ends of the inner bush are connected with the ball nut and the parison die mandrel through the screws, respectively.

An extrusion blow molding method realized using the aforementioned extrusion blow molding machine includes the steps of: (1) relevant assembly and device are set at their initial state; (2) the step for the parison formation is carried out; and (3) the step for the parison inflation and part cooling is carried out.

Said step (1) can be described as follows. The brake clutch in the clutch member is energized to couple the output shaft with the housing, the first and second clutches are deenergized, the mold-opening/closing assembly is at mold-opening state, the two mold halves are located at the parison formation station, and both mold-clamping and mold-moving clutches are deenergized.

Said step (2) can be described as follows. Start the main motor of the extrusion apparatus, which rotates the extruder screw to plasticize the polymer material and extrudes the polymer melt into the parison die to form an annular parison. Then, the first and second motors run simultaneously, the brake clutch is deenergized and the first or second clutch is energized, which drives the ball screw to rotate in the clockwise or counterclockwise direction through the reduction box and the shaft coupling. The clockwise or counterclockwise rotation of the ball screw imparts the parison die mandrel to move downwards or upwards through the ball nut and the inner bush. When the mandrel reaches a predetermined location, the first or second clutch is deenergized and the brake clutch is energized. Combing with the opening geometry of the parison die, the fine axial movement of the mandrel can finely adjust the die gap and so the parison thickness. A required number of the die gap programming can be carried out in an entire parison formation step according to the blow molded parts. Consequently, a required axial parison thickness distribution can be achieved.

Said step (3) can be described as follows. Run the servo motor normally and energize the mold-clamping clutch, thus rotating the mold-clamping ball screw normally through the gear transmission box. The normal rotation of the ball screw moves the mold-clamping ball nut forwards, so driving the toggle mechanism, and moving the middle plate and the front plate synchronously and relatively through the synchronizing means. As the toggle mechanism is completely straightened, the two mold halves are clamped and hold the two ends of the aforesaid parison. Hereto, the mold closing terminates. Then, the aforesaid parison is cut off just below the exit of the parison die using a cutter. The mold-clamping clutch is deenergized, and the mold-moving clutch is energized, so the normal running of the servo motor rotates the mold-moving ball nut normally through the gear transmission box and the coupling device. The normal rotation of the ball nut moves the base along the mold-moving linear guides to the parison inflation station. Next, the mold-moving clutch is deenergized and the servo motor stops. The parison within the mold cavity is inflated by the compressed air and the inflated parison is cooled while it is contacted tightly with the mold cavity. When the product is finally molded, run the servo motor oppositely, and energize the mold-clamping clutch. This rotates the mold-clamping ball screw oppositely through the gear transmission box. Then, the mold opening, which is contrary to the aforesaid mold closing, progresses. When the two mold halves open, the mold-clamping clutch is deenergized and the product is taken out of the mold cavity. Then, energize the mold-moving clutch, the opposite running of the servo motor rotates the mold-moving ball nut oppositely through the gear transmission box and the coupling device, which moves the base along the mold-moving linear guides to the parison formation station. Then, the mold-moving clutch is deenergized, and the servo motor stops. Hereto, the blow molding for one cycle terminates, and the next cycle can be followed.

Two asynchronous motors, instead of the servo motor, are used in the present electrically-driven parison thickness programming apparatus. The motors run in a single direction continuously in an entire parison formation step, which results in a required number of the die gap programming and so a required axial parison thickness distribution through rapid actuation and release of the clutches. Neither frequent start and stop nor frequent normal and opposite running of the motor occurs. The mold opening/closing and mold-moving are realized by the electrically-driven mold-clamping apparatus with a dual-driving function, that is, a single servo motor drives both mold opening/closing and mold-moving assemblies, respectively. Therefore, compared with the available extrusion blow molding machines, the extrusion blow molding machine according to the present invention has an obviously simplified and compact structure, a lower manufacturing cost and energy consumption, a simpler and more reasonable operation, a longer service life, and a higher transmission efficiency and positioning accuracy.

DETAILED DESCRIPTION OF THE INVENTION

The invention will be described in more detail with the aid of the embodiments and the accompanying drawings, but the mode for carrying out the invention is not limited to what described as follows.

Figure 1:
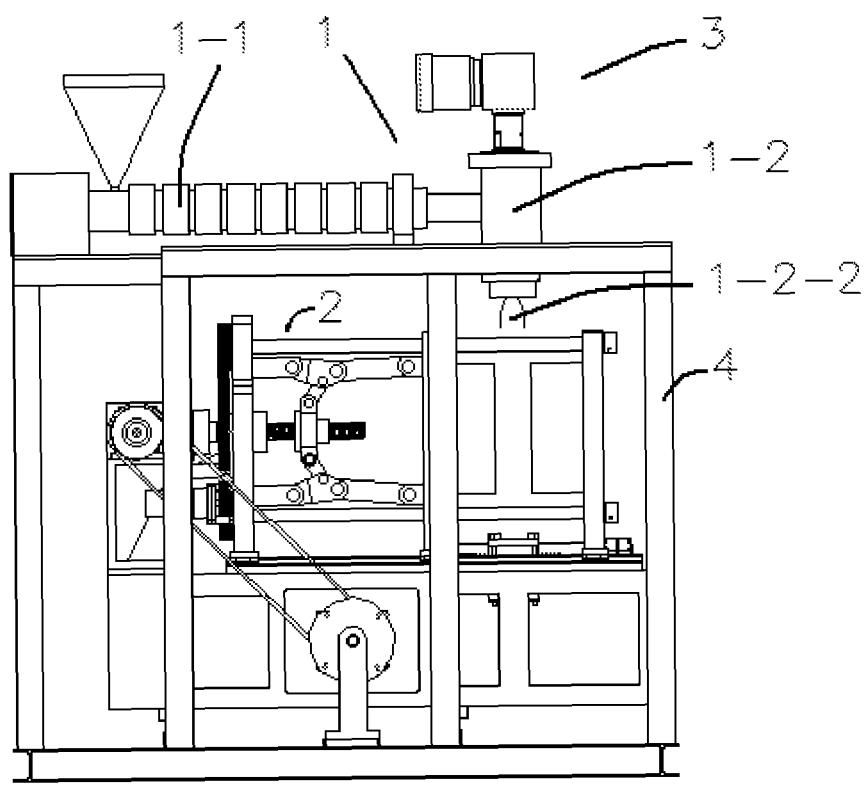
FIG. 1 is a schematic view showing a basic construction of an extrusion blow molding machine according to the present invention.

FIG. 1 shows a basic construction of an extrusion blow molding machine according to the present invention, which comprises an extrusion apparatus 1, a mold-clamping apparatus with a dual-driving function 2, a parison thickness programming apparatus 3, and a frame 4. The extrusion apparatus 1 primarily comprises an extruder 1-1 and a parison die 1-2. Both the extruder 1-1 and the parison die 1-2 are well known in the prior art. Therefore, it is contemplated that any suitable extruder or parison die may be utilized with the present invention. The parison die 1-2 is connected directly to the end of the extruder 1-1. The parison thickness programming apparatus 3 sits on the top of the parison die 1-2. Within the frame 4 and under the extruder 1-1 is mounted the mold-clamping apparatus with a dual-driving function 2.

Figure 2:
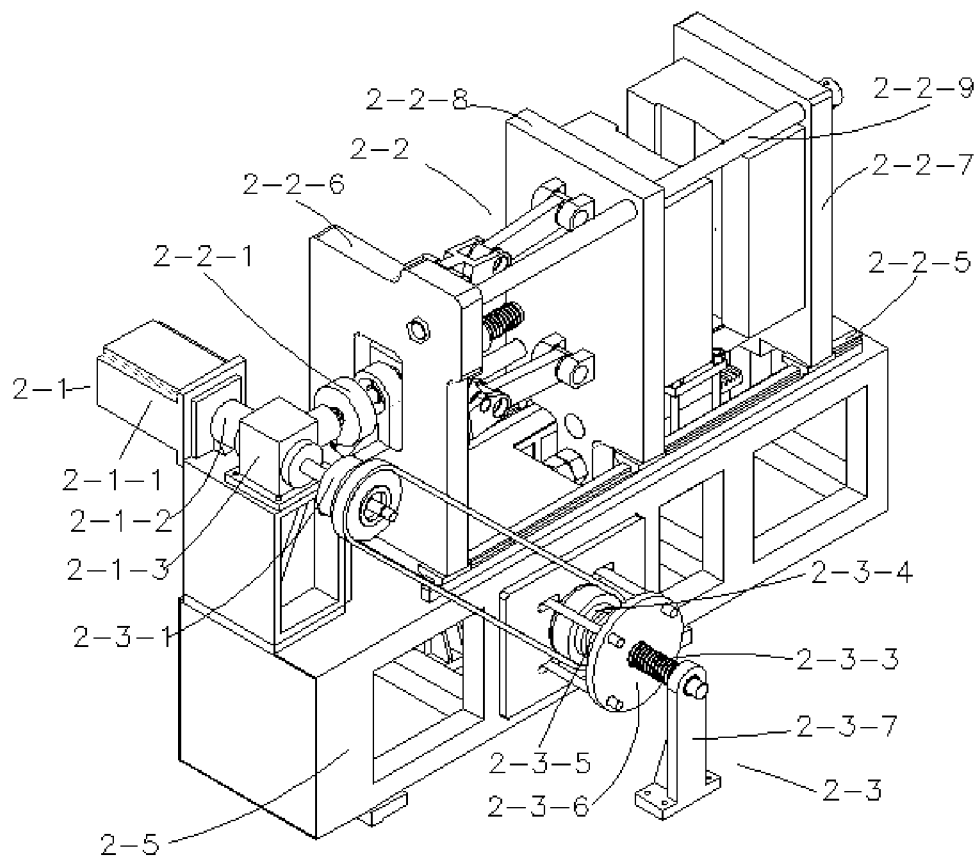
FIG. 2 is a schematic view of the mold-clamping apparatus with a dual-driving function of the machine according to the present invention.
Figure 3:
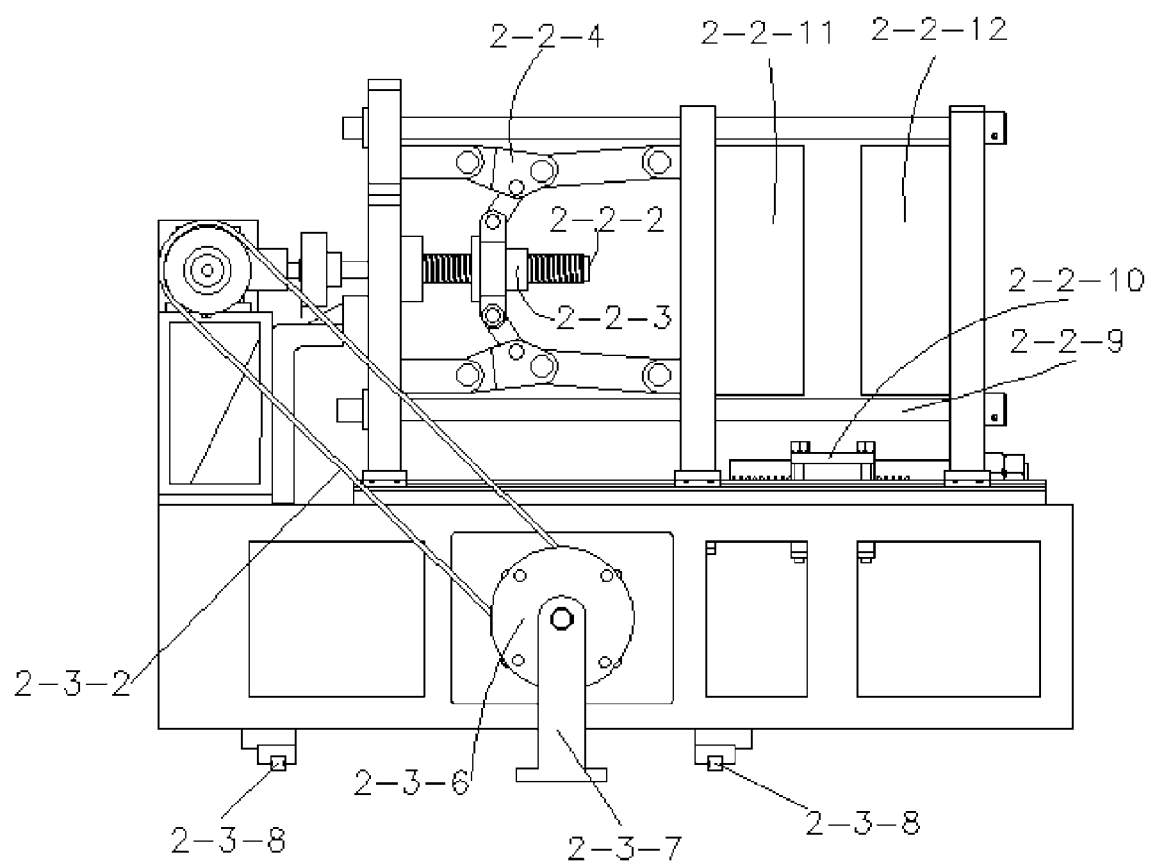
FIG. 3 is a schematic front view of the mold-clamping apparatus with a dual-driving function of the machine according to the present invention.

With reference to FIGS. 2 and 3, the mold-clamping apparatus with a dual-driving function 2 comprises a driving assembly 2-1, a mold-opening/closing assembly 2-2, a mold-moving assembly 2-3, and a base 2-5. The driving assembly 2-1, the mold-opening/closing assembly 2-2, and the mold-moving assembly 2-3 are integrally connected and installed on the base 2-5.

The driving assembly 2-1 includes a servo motor 2-1-1, a coupling 2-1-2, and a gear transmission box 2-1-3. The gear transmission box 2-1-3, which is connected with the servo motor 2-1-1 through a coupling 2-1-2, has two mutually perpendicular output shafts. The mold-opening/closing assembly 2-2 comprises a mold-clamping clutch 2-2-1, a mold-clamping ball screw 2-2-2 with a ball nut 2-2-3, a toggle mechanism 2-2-4, two mold-clamping linear guides 2-2-5, a back plate 2-2-6, a front plate 2-2-7, a middle plate 2-2-8, a required number of tie bars 2-2-9, a synchronizing means 2-2-10, and two mold halves 2-2-11 and 2-2-12. The output end of the mold-clamping clutch 2-2-1 is jointed with the shaft end of the mold-clamping ball screw 2-2-2, which is rotatably mounted across the back plate 2-2-6 through a ball bearing. The two ends of the toggle mechanism 2-2-4 are mounted on the back plate 2-2-6 and the middle plate 2-2-8, respectively, and the crosshead of the toggle mechanism 2-2-4 is connected with the mold-clamping ball nut 2-2-3. The middle plate 2-2-8 is movably mounted on the tie bars 2-2-9. The synchronizing means 2-2-10 is installed on the base 2-5. Two ends of the synchronizing means 2-2-10 are connected with the middle plate 2-2-8 and the front plate 2-2-7, respectively. On the opposed surfaces between the front plate 2-2-7 and the middle plate 2-2-8 are mounted the mold halves 2-2-11 and 2-2-12, respectively. The back plate 2-2-6, the front plate 2-2-7, and the middle plate 2-2-8 can reciprocate along the mold-clamping linear guides 2-2-5, which are installed on the base 2-5. The mold-moving assembly 2-3 includes a mold-moving clutch 2-3-1, a coupling device 2-3-2, a mold-moving ball screw 2-3-3 with a ball nut 2-3-4, two tapered roller bearings 2-3-5, two glands 2-3-6, two support plates 2-3-7, and two mold-moving linear guides 2-3-8. The driving end of the coupling device 2-3-2 is jointed with the output end of the mold-moving clutch 2-3-1. The driven end of the coupling device 2-3-2 and the mold-moving ball nut 2-3-4 are connected together through screws and are supported within the tapered roller bearings 2-3-5, which are positioned within the two glands 2-3-6. The two glands 2-3-6 are mounted on the two side surfaces of the side plate in the base 2-5 through screws. Both shaft ends of the mold-moving ball screw 2-3-3 are fixed in the support plates 2-3-7. The mold-moving linear guides 2-3-8, which are perpendicular to the mold-clamping linear guides 2-2-5, and the support plates 2-3-7 are installed on the frame 4. The two output ends of the gear transmission box 2-1-3 are jointed with the input ends of both mold-clamping clutch 2-2-1 and mold-moving clutch 2-3-1, respectively. The base 2-5 can reciprocate on the mold-moving linear guides 2-3-8.

Figure 4:
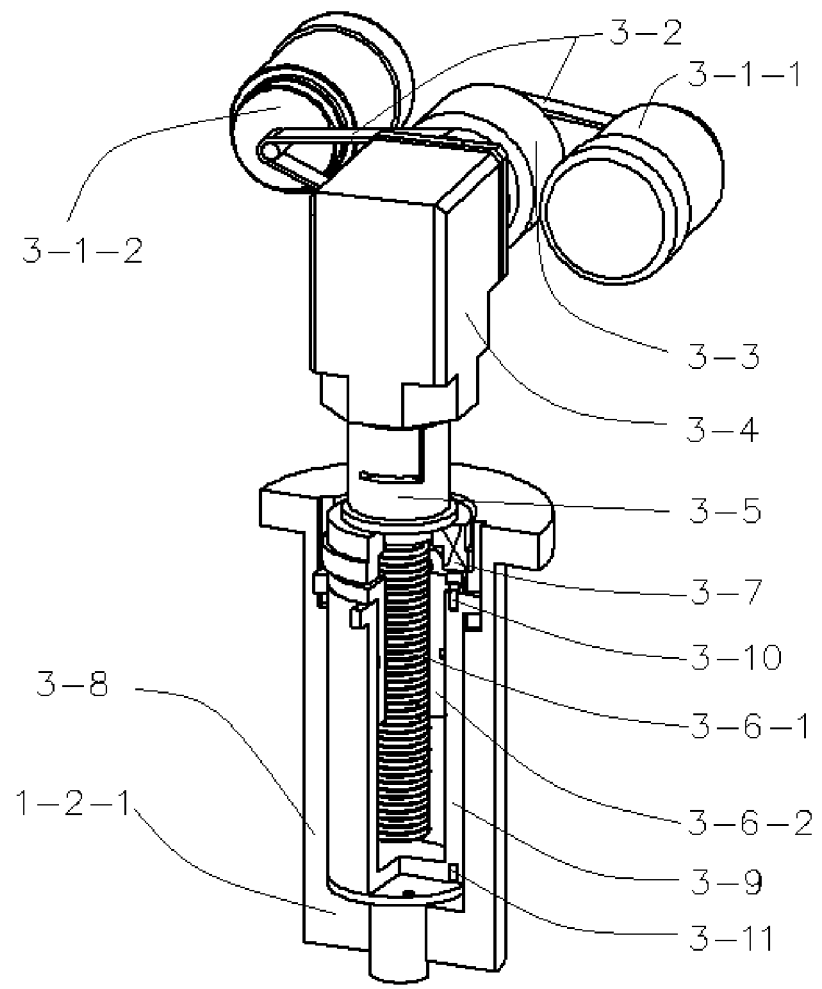
FIG. 4 is a schematic view of the parison thickness programming apparatus of the machine according to the present invention.
Figure 5:
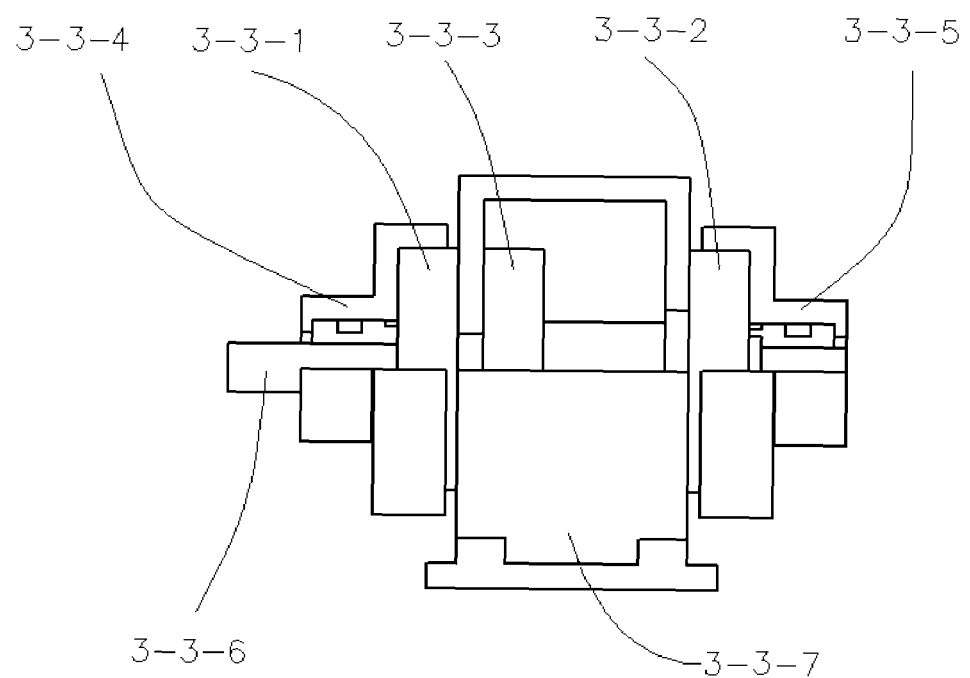
FIG. 5 is a schematic view of the clutch member in the parison thickness programming apparatus of the machine according to the present invention.

Reference is now made to FIG. 4, the parison thickness programming apparatus 3 includes a first motor 3-1-1, a second motor 3-1-2, two synchronous belts 3-2, a clutch member 3-3, a reduction box 3-4, a shaft coupling 3-5, a ball screw 3-6-1 with a ball nut 3-6-2, a thrust bearing 3-7, an outer bush 3-8 with a sliding chute, and an inner bush 3-9 with a sliding block. Referring to FIG. 5, the clutch member 3-3 consists of a first clutch 3-3-1, a second clutch 3-3-2, a brake clutch 3-3-3, a first input turnplate 3-3-4, a second input turnplate 3-3-5, an output shaft 3-3-6, and a housing 3-3-7. The first and second motors 3-1-1 and 3-1-2 are connected with the first and second input turnplates 3-3-4 and 3-3-5, respectively, by means of the synchronous belts 3-2. The first clutch 3-3-1, the second clutch 3-3-2, and the brake clutch 3-3-3 share the output shaft 3-3-6 as the output. The first or second input turnplate 3-3-4 or 3-3-5 is coupled with the output shaft 3-3-6 of the clutch member when the first or second clutch 3-3-1 or 3-3-2 is energized; whereas the output shaft 3-3-6 is coupled with the housing 3-3-7 when the brake clutch 3-3-3 is energized. The output shaft 3-3-6 of the clutch member is jointed with the input end of the reduction box 3-4, the output end of which is connected with the shaft end of the ball screw 3-6-1 through the shaft coupling 3-5. The shaft end of the ball screw 3-6-1 is rotatably mounted in the shoulder at the top of the outer bush 3-8 through the thrust bearing 3-7. The ball nut 3-6-2 is carried within the cross sliding block in the inner bush 3-9 and so is restrained from rotation. The inner bush 3-9 is positioned within the outer bush 3-8. Both ends of the inner bush 3-9 are connected with the ball nut 3-6-2 and the mandrel 1-2-1 in the parison die 1-2 through the screws 3-10 and 3-11, respectively.

The operation of the extrusion blow molding machine according to the present invention is described as follows.

Initially, the brake clutch 3-3-3 in the clutch member 3-3 is energized to couple the output shaft 3-3-6 with the housing 3-3-7, the first and second clutches 3-3-1 and 3-3-2 are deenergized, the mold-opening/closing assembly 2-2 is at mold-opening state, the two mold halves 2-2-11 and 2-2-12 are located at the parison formation station, and both mold-clamping clutch 2-2-1 and mold-moving clutch 2-3-1 are deenergized. Next, the step for the parison formation is initiated. Start the main motor of the extrusion apparatus 1, which rotates the screw of the extruder 1-1 to plasticize the polymer material and extrudes the polymer melt into the parison die 1-2 to form an annular parison 1-2-2. Then, the first and second motors 3-1-1 and 3-1-2 run simultaneously, the brake clutch 3-3-3 is deenergized and the first or second clutch 3-3-1 or 3-3-2 is energized, which drives the ball screw 3-6-1 to rotate clockwise or counterclockwise through the reduction box 3-4 and the shaft coupling 3-5. The clockwise or counterclockwise rotation of the ball screw 3-6-1 imparts the parison die mandrel 1-2-1 to move downwards or upwards through the ball nut 3-6-2 and the inner bush 3-9. When the mandrel 1-2-1 reaches a predetermined location, the first or second clutch 3-3-1 or 3-3-2 is deenergized and the brake clutch 3-3-3 is energized. Combing with the opening geometry of the parison die 1-2, the fine axial movement of the mandrel 1-2-1 can finely adjust the die gap and so the parison thickness. A required number of the die gap programming can be completed in an entire parison formation step according to the blow molded parts. Consequently, a required axial parison thickness distribution can be obtained.

When the parison 1-2-2 with a required axial parison thickness distribution is formed, the step for the parison inflation and part cooling is initiated by running the servo motor 2-1-1 normally and energizing the mold-clamping clutch 2-2-1. This rotates the mold-clamping ball screw 2-2-2 normally through the gear transmission box 2-1-3. The normal rotation of the ball screw 2-2-2 moves the mold-clamping ball nut 2-2-3 forwards, thus driving the toggle mechanism 2-2-4, and moving the middle plate 2-2-8 and the front plate 2-2-7 synchronously and relatively through the synchronizing means 2-2-10. As the toggle mechanism 2-2-4 is completely straightened, the two mold halves 2-2-11 and 2-2-12 are clamped and hold the two ends of the parison 1-2-2. Hereto, the mold closing terminates. Then, the parison 1-2-2 is cut off just below the exit of the parison die 1-2 using a cutter. The mold-clamping clutch 2-2-1 is deenergized, and the mold-moving clutch 2-3-1 is energized, so the normal running of the servo motor 2-1-1 rotates the mold-moving ball nut 2-3-4 normally through the gear transmission box 2-1-3 and the coupling device 2-3-2. The normal rotation of the ball nut 2-3-4 moves the base 2-5 along the mold-moving linear guides 2-3-8 to the parison inflation station. Next, the mold-moving clutch 2-3-1 is deenergized and the servo motor 2-1-1 stops. The parison 1-2-2 within the mold cavity is inflated by the compressed air and the inflated parison is cooled while it is contacted tightly with the mold cavity. When the product is finally molded, run the servo motor 2-1-1 oppositely, and energize the mold-clamping clutch 2-2-1. This rotates the mold-clamping ball screw 2-2-2 oppositely through the gear transmission box 2-1-3. Then, the mold opening, which is contrary to the aforesaid mold closing, occurs. When the two mold halves 2-2-11 and 2-2-12 open, the mold-clamping clutch 2-2-1 is deenergized and the product is taken out of the mold cavity. Then, energize the mold-moving clutch 2-3-1, the opposite running of the servo motor 2-1-1 rotates the mold-moving ball nut 2-3-4 oppositely through the gear transmission box 2-1-3 and the coupling device 2-3-2, which moves the base 2-5 along the mold-moving linear guides 2-3-8 to the parison formation station. Then, the mold-moving clutch 2-3-1 is deenergized, and the servo motor 2-1-1 stops. Hereto, the blow molding for one cycle terminates, and the next cycle can be followed.

The foregoing description and the drawings are illustrative of the present invention and are not to be taken as limiting, other embodiments are also allowed. For instance, in the mold-clamping apparatus with a dual-driving function, the synchronous belt driving device can be replaced by a chain transmission device or other coupling devices. In the parison thickness programming apparatus, the clutch member can be replaced by two clutches, the output ends of which are counter-rotated; the die mandrel can be connected directly to the ball screw. Still other variants and rearrangements of parts within the spirit and scope of the present invention are possible and will be readily apparent to those skilled in the art.

What is claimed is:

1. An extrusion blow molding machine, characterized in that it comprises an extrusion apparatus, an electrically-driven parison thickness programming apparatus, an electrically-driven mold-clamping apparatus with a dual-driving function, and a frame, wherein the extrusion apparatus, the parison thickness programming apparatus and the mold-clamping apparatus with a dual-driving function are installed on the frame; and characterized in that,
   the mold-clamping apparatus with a dual-driving function comprises a mold opening/closing assembly;
   a mold-moving assembly;
   a driving assembly, comprising a servo motor, which actuates the mold opening/closing and mold-moving assemblies respectively, a coupling, and a gear transmission box connected with the servo motor through a coupling; and
   a base, on which the driving assembly, the mold-opening/closing assembly, and the mold-moving assembly are installed.

2. The extrusion blow molding machine according to claim 1, characterized in that
   the parison thickness programming apparatus includes a first motor, a second motor, two synchronous belts, a clutch member, a reduction box, a shaft coupling, a ball screw with a ball nut, a thrust bearing, an outer bush with a sliding chute, and an inner bush with a sliding block; the clutch member consists of a first clutch, a second clutch, a brake clutch, a first input turnplate, a second input turnplate, an output shaft, and a housing; the first and second motors, which run in a single direction continuously in an entire parison formation step, are connected with the first and second input turnplates, respectively, by means of the synchronous belts; the first clutch, the second clutch, and the brake clutch share the output shaft of the clutch member as the output; the first or second input turnplate is coupled with the output shaft of the clutch member when the first or second clutch is energized, whereas the output shaft is coupled with the housing when the brake clutch is energized; the output shaft of the clutch member is jointed with the input end of the reduction box, the output end of which is connected with the shaft end of the ball screw through the shaft coupling; the shaft end of the ball screw is rotatably mounted in the shoulder at the top of the outer bush through the thrust bearing; the ball nut is carried within the cross sliding block in the inner bush and so is restrained from rotation; the inner bush is coaxially positioned within the outer bush; both ends of the inner bush are connected with the ball nut and the parison die mandrel through the screws, respectively.

3. The extrusion blow molding machine according to claim 1, characterized in that the mold-opening/closing assembly comprises a mold-clamping clutch, a mold-clamping ball screw with a ball nut, a toggle mechanism, two mold-clamping linear guides, a back plate, a front plate, a middle plate, a required number of tie bars, a synchronizing means, and two mold halves; the output end of the mold-clamping clutch is jointed with the shaft end of the mold-clamping ball screw, which is rotatably mounted across the back plate through a ball bearing; the two ends of the toggle mechanism are mounted on the back plate and the middle plate, respectively, and the crosshead of the toggle mechanism is connected with the mold-clamping ball nut; the middle plate is movably mounted on the tie bars; the synchronizing means is installed on the base; two ends of the synchronizing means are connected with the middle plate and the front plate, respectively; on the opposed surfaces between the front plate and the middle plate are mounted the mold halves; the back plate, the front plate, and the middle plate can reciprocate along the mold-damping linear guides, which are installed on the base.

4. The extrusion blow molding machine according to claim 1, characterized in that the mold-moving assembly includes a mold-moving clutch, a coupling device, a mold-moving ball screw with a ball nut, two tapered roller bearings, two glands, two support plates, and two mold-moving linear guides; the driving end of the coupling device is jointed with the output end of the mold-moving clutch; the driven end of the coupling device and the mold-moving bail nut are connected together through screws and are supported within the tapered roller bearings, which are positioned within the two glands; the two glands are mounted on the two side surfaces of the side plate in the base through screws; both shaft ends of the mold-moving bail screw are fixed in the support plates; the mold-moving linear guides, which are perpendicular to the mold-damping linear guides, and the support plates are installed on the frame; the base can reciprocate on the mold-moving linear guides.

5. The extrusion blow molding machine according to claim 4, characterized in that the coupling device can be a synchronous belt driving device or a chain transmission device; the synchronous belt driving device comprises a synchronous belt, a driving pulley, and a driven pulley; the driving pulley is connected with the driven pulley via the synchronous belt.

6. The extrusion blow molding machine according to claim 1, characterized in that the gear transmission box has two mutually perpendicular output shafts, which are jointed with the input ends of both mold-clamping clutch and mold-moving clutch, respectively.

7. An extrusion blow molding method using the extrusion blow molding machine as in claim 1, characterized in that it includes the steps of: (1) relevant assembly and device are set at their initial state; (2) the step for the parison formation is performed; and (3) the step for the parison inflation and pad cooling is performed.

8. An extrusion blow molding method using the present extrusion blow molding machine according to claim 7, characterized in that step (1) is described as follows: the brake clutch in the clutch member is energized to couple the output shaft with the housing, the first and second clutches are deenergized, the mold-opening/closing assembly is at mold-opening state, the two mold halves are located at the parison formation station, and both mold-clamping and mold-moving clutches are deenergized.

9. An extrusion blow molding method using the present extrusion blow molding machine according to claim 7, characterized in that step (2) is described as follows: Start the main motor of the extrusion apparatus, which rotates the extruder screw to plasticize the polymer material and extrudes the polymer melt into the parison die to form an annular parison; then the first and second motors run simultaneously, the brake clutch is deenergized and the first or second clutch is energized, which drives the ball screw to rotate in the clockwise or counterclockwise direction through the reduction box and the shaft coupling; the clockwise or counterclockwise rotation of the ball screw imparts the parison die mandrel to move downwards or upwards through the ball nut and the inner bush; when the mandrel reaches a predetermined location, the first or second clutch is deenergized and the brake clutch is energized; combing with the opening geometry of the parison die, the fine axial movement of the mandrel can finely adjust the die gap and so the parison thickness; a required number of the die gap programming can be carried out in an entire parison formation step according to the blow molded parts; consequently, a required axial parison thickness distribution can be achieved.

10. An extrusion blow molding method using the present extrusion blow molding machine according to claim 7, characterized in that step (3) is described as follows: run the servo motor normally and energize the mold-clamping dutch, thereby rotating the mold-clamping ball screw normally through the gear transmission box; the normal rotation of the ball screw moves the mold-clamping ball nut forwards, thereby driving the toggle mechanism, and moving the middle plate and the front plate synchronously and relatively through the synchronizing means; as the toggle mechanism is completely straightened, the two mold halves are clamped and hold the two ends of the aforesaid parison; hereto, the mold closing terminates; then, the parison is cut off just below the exit of the parison die using a cutter; the mold-clamping clutch is deenergized, and the mold-moving clutch is energized, so the normal running of the servo motor rotates the mold-moving ball nut normally through the gear transmission box and the coupling device; the normal rotation of the ball nut moves the base along the mold-moving linear guides to the parison inflation station; next, the mold-moving clutch is deenergized and the servo motor stops; the parison within the mold cavity is inflated by the compressed air and the inflated parison is cooled while it is contacted tightly with the mold cavity; when the product is finally molded, run the servo motor oppositely, and energize the mold-clamping clutch; this rotates the mold-clamping ball screw oppositely through the gear transmission box; then, the mold opening, which is contrary to the aforesaid mold closing, progresses; when the two mold halves open, the mold-clamping clutch is deenergized and the product is taken cut of the mold cavity; then, energize the mold-moving clutch, the opposite running of the servo motor rotates the mold-moving ball nut oppositely through the gear transmission box and the coupling device, which moves the base along the mold-moving linear guides to the parison formation station; then, the mold-moving clutch is deenergized, and the servo motor stops; hereto, the blow molding for one cycle terminates, and the next cycle can be followed.

\* \* \* \* \*